United States Patent
Pahlke

(10) Patent No.: US 11,795,032 B2
(45) Date of Patent: Oct. 24, 2023

(54) MONITORING SYSTEM

(71) Applicant: Otis Elevator Company, Farmington, CT (US)

(72) Inventor: Derk Oscar Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1381 days.

(21) Appl. No.: 16/189,209

(22) Filed: Nov. 13, 2018

(65) Prior Publication Data

US 2020/0148504 A1    May 14, 2020

(51) Int. Cl.
| | |
|---|---|
| B66B 5/00 | (2006.01) |
| B66B 5/02 | (2006.01) |
| B66B 13/08 | (2006.01) |
| G01N 29/00 | (2006.01) |
| B66B 3/02 | (2006.01) |

(52) U.S. Cl.
CPC ............ *B66B 5/0018* (2013.01); *B66B 13/08* (2013.01); *B66B 3/023* (2013.01); *B66B 5/0037* (2013.01); *G01N 29/00* (2013.01)

(58) Field of Classification Search
CPC ................... B66B 5/00; B66B 5/0006; B66B 5/0018–0037; B66B 5/0087
See application file for complete search history.

(56) References Cited

U.S. PATENT DOCUMENTS

| | | | |
|---|---|---|---|
| 5,901,232 A | 5/1999 | Gibbs | |
| 6,198,693 B1 | 3/2001 | Marash | |
| 6,469,732 B1 | 10/2002 | Chang et al. | |
| 6,923,065 B2 * | 8/2005 | Smith | G01N 29/07 73/602 |
| 7,039,198 B2 | 5/2006 | Birchfield et al. | |
| 7,162,043 B2 | 1/2007 | Sugiyama et al. | |

(Continued)

FOREIGN PATENT DOCUMENTS

| | | |
|---|---|---|
| CN | 101580198 A | 11/2009 |
| CN | 102033223 B | 4/2011 |

(Continued)

OTHER PUBLICATIONS

Noise Vision omnidirectional sound source identification system. Hibino Group/Nihon Onkyo Engineering Co., Ltd. Retrieved Oct. 31, 2018 from https://www.noe.co.jp/en/product/pdt4/pd06/detail01.html. 7 Pages.

(Continued)

*Primary Examiner* — Christopher Uhlir
(74) *Attorney, Agent, or Firm* — CANTOR COLBURN LLP

(57) ABSTRACT

An elevator system includes a car door and a sensor module. The car door is movable relative to an elevator car by a drive mechanism. The sensor module includes a first acoustic sensor arranged to provide a first acoustic signal, a second acoustic sensor arranged to provide a second acoustic signal, and a processor arranged to receive the first acoustic signal and the second acoustic signal. The processor is programmed to, responsive to an input provided to the first acoustic sensor and the second acoustic sensor, identify a direction of an elevator system noise source based on a first time delay based on the first acoustic signal and the second acoustic signal.

14 Claims, 3 Drawing Sheets

FIG 4

(56) References Cited

U.S. PATENT DOCUMENTS

| | | |
|---|---|---|
| 7,308,105 B2 | 12/2007 | Bullen |
| 7,379,553 B2 | 5/2008 | Nakajima et al. |
| 8,155,346 B2 | 4/2012 | Yoshizawa et al. |
| 8,194,500 B2 | 6/2012 | Wolff et al. |
| 8,204,248 B2 | 6/2012 | Haulick et al. |
| 9,557,400 B2 | 1/2017 | Wu |
| 2011/0051952 A1 | 3/2011 | Ohashi et al. |
| 2011/0075860 A1 | 3/2011 | Nakagawa et al. |
| 2018/0090138 A1 | 3/2018 | Finn et al. |
| 2018/0257908 A1* | 9/2018 | Moeller ............... B66B 1/3446 |
| 2019/0344995 A1* | 11/2019 | Nowel ................. B66B 1/28 |

FOREIGN PATENT DOCUMENTS

| | | |
|---|---|---|
| CN | 102992129 A | 3/2013 |
| CN | 103303758 A | 9/2013 |
| CN | 106908755 A | 6/2017 |
| DE | 102016108273 A1 | 11/2017 |
| EP | 1866231 B1 | 4/2013 |
| JP | H10332807 A | 12/1998 |
| JP | 2006194700 A | 7/2006 |
| JP | 2011015050 A | 1/2011 |
| JP | 2011178544 A | 9/2011 |
| WO | 2013015461 A1 | 1/2013 |
| WO | 2016193077 A1 | 12/2016 |

OTHER PUBLICATIONS

European Search Report for application EP 19208707.0, dated Apr. 17, 2020, 90 pages.

* cited by examiner

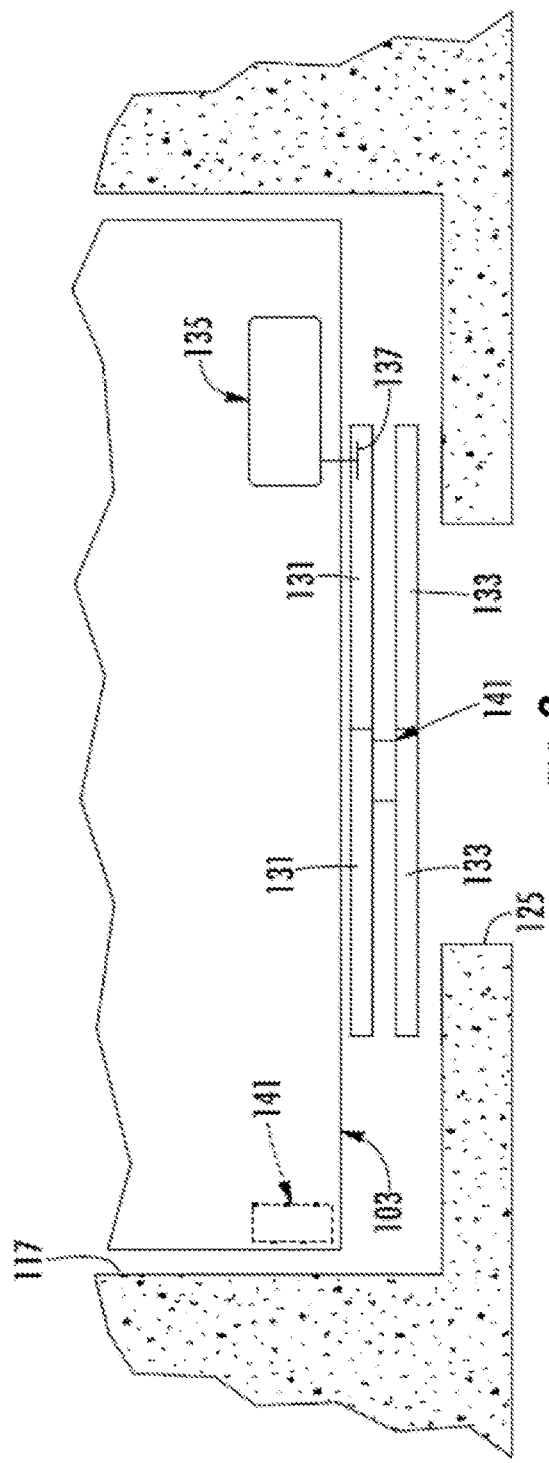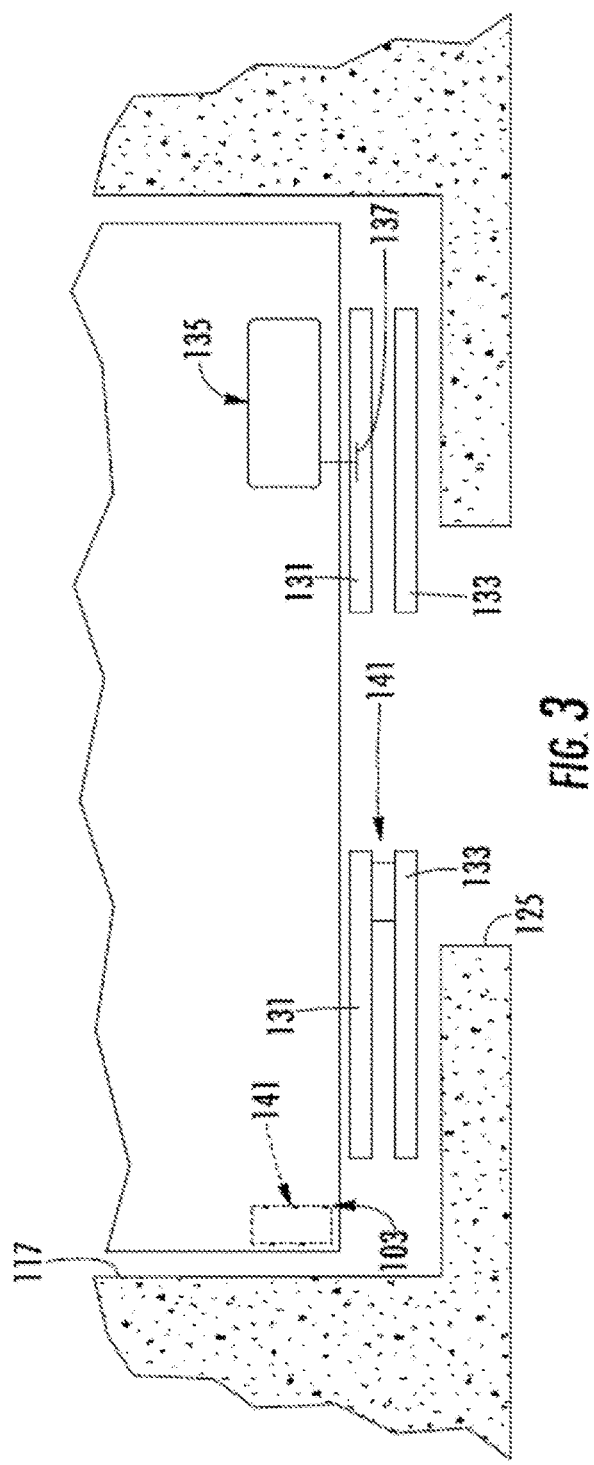

MONITORING SYSTEM

BACKGROUND

Exemplary embodiments pertain to the art of monitoring systems for elevator systems.

Elevator systems include movable parts whose performance or condition may need to be monitored to provide status information, promote intervention, and/or predictive maintenance. Some monitoring systems may collect information concerning elevator car acceleration, temperature, relative humidity, air pressure, and noise. However, typical status monitoring systems are unable to locate the source of a potential issue.

BRIEF DESCRIPTION

Disclosed is an elevator system that includes a car door and a sensor module. The car door is movable relative to an elevator car by a drive mechanism. The sensor module includes a first acoustic sensor arranged to provide a first acoustic signal, a second acoustic sensor arranged to provide a second acoustic signal, and a processor arranged to receive the first acoustic signal and the second acoustic signal. The processor is programmed to, responsive to an input provided to the first acoustic sensor and the second acoustic sensor, identify a direction of an elevator system noise source based on a first time delay based on the first acoustic signal and the second acoustic signal.

Also disclosed is a monitoring system for an elevator that includes a sensor module. The sensor module includes a first accelerometer arranged to provide a first acceleration signal, a second accelerometer arranged to provide a second acceleration signal, and a processor arranged to receive the first acceleration signal and the second acceleration signal. The processor is programmed to, responsive to an input provided to the first accelerometer and the second accelerometer, identify a direction of an elevator system noise source based on a spatial difference between the first acceleration signal and the second acceleration signal.

Further disclosed is a sensor module for an elevator monitoring system. The sensor module includes a first acoustic sensor arranged to provide a first acoustic signal; a second acoustic sensor arranged to provide a second acoustic signal; a first accelerometer arranged to provide a first acceleration signal; a second accelerometer arranged to provide a second acceleration signal; and a processor arranged to receive the first acoustic signal, the second acoustic signal, the first acceleration signal, and the second acceleration signal. The processor is programmed to, responsive to an input provided to the first acoustic sensor, the second acoustic sensor, the first accelerometer, and the second accelerometer, identify a direction of an elevator system noise source based on: a first time delay between the first acoustic signal and the second acoustic signal and a first spatial difference between the first acceleration signal and the second acceleration signal.

BRIEF DESCRIPTION OF THE DRAWINGS

The following descriptions should not be considered limiting in any way. With reference to the accompanying drawings, like elements are numbered alike:

FIGS. 2 and 3 are plan views of an elevator car of the elevator system within an elevator hoistway;

DETAILED DESCRIPTION

A detailed description of one or more embodiments of the disclosed apparatus and method are presented herein by way of exemplification and not limitation with reference to the Figures.

Figure 1:
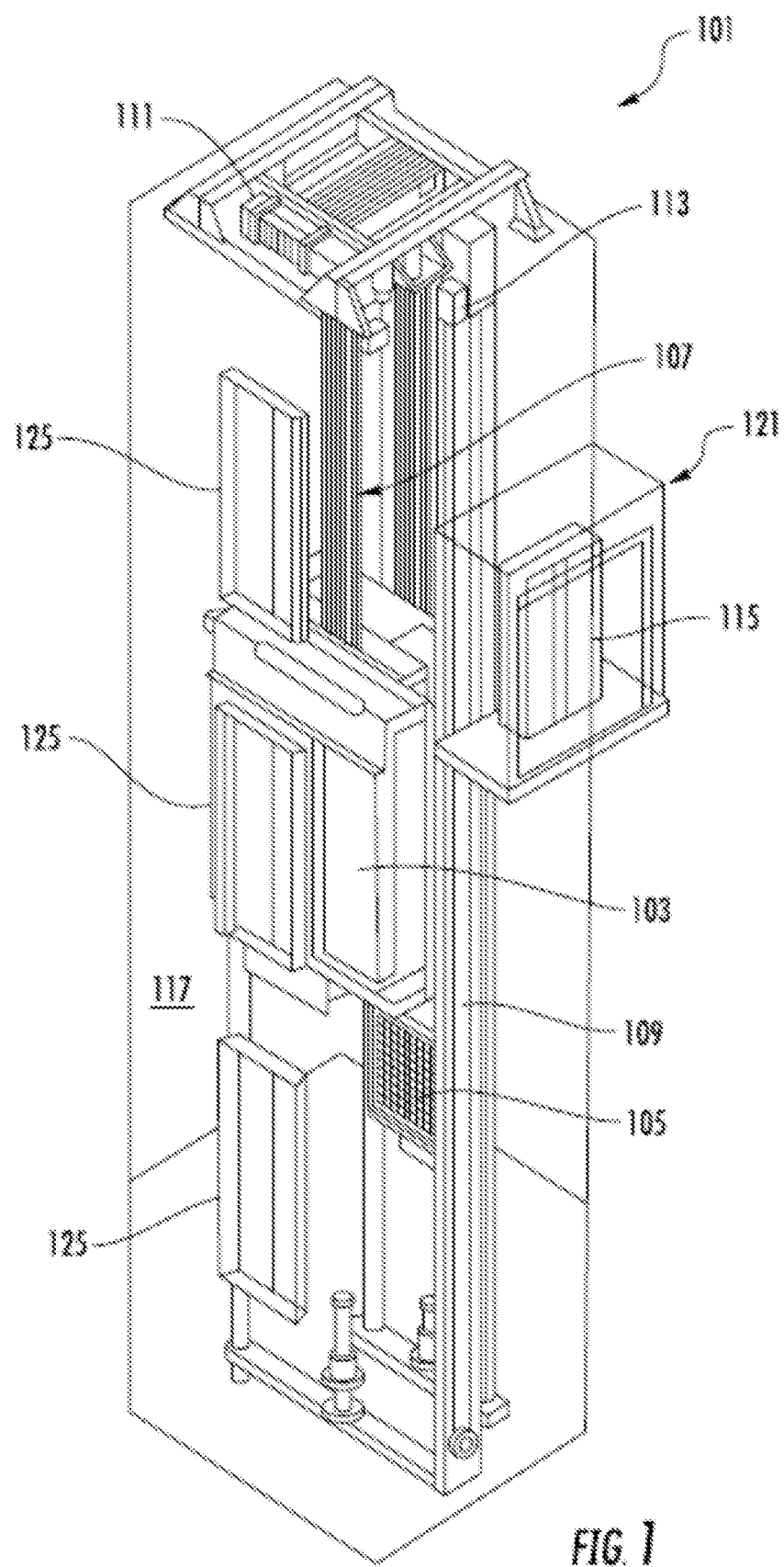
FIG. 1 is a perspective view of an elevator system.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 4:
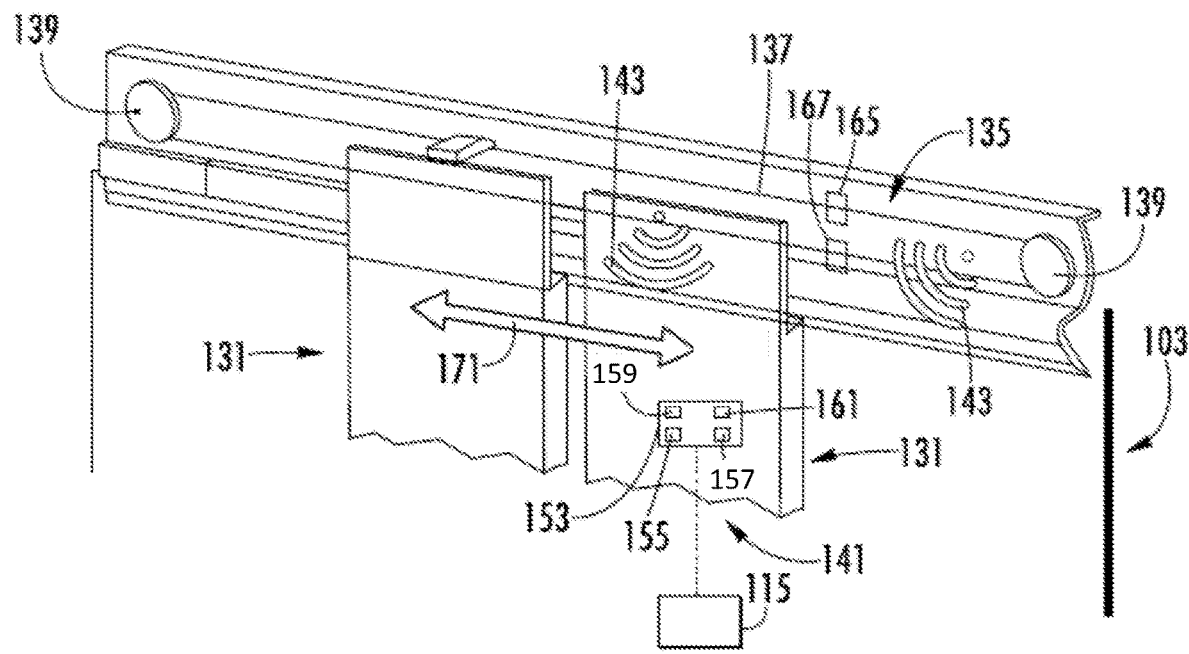
FIG. 4 is a perspective view of a monitoring system provided with the elevator system.
Figure 5:
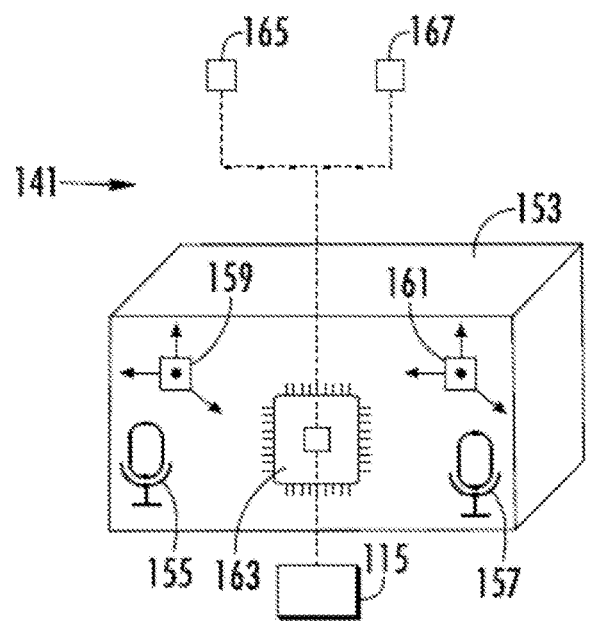
FIG. 5 is a perspective view of a sensor module of the monitoring system.

Referring to FIGS. 2 and 3, the elevator car 103 of the elevator system 101 is shown in plan view within the elevator hoistway 117. The elevator car 103 includes a pair of movable elevator car doors 131 that move in correspondence with the movable landing doors 133. The elevator car doors 131 and/or the movable landing doors 133 are moved between a closed position, as shown in FIG. 2, and an open position, as shown in FIG. 3, by a drive mechanism 135 that is coupled to the elevator car doors 131 and/or the landing doors 133. The drive mechanism 135 has a belt drive 137 and rolling/drive members 139 to facilitate the operation of the belt drive 137, as shown in FIG. 4.

Referring to FIGS. 2-5, a monitoring system 141 may be provided with the elevator system 101 that is positioned or arranged to provide information to facilitate the prediction on the health status of the elevator system 101 or an escalator. Typically, prior to an incident or failure with an elevator component, noise or vibrations may be produced by the elevator component. The monitoring system 141 is arranged to or positioned to detect/receive inputs from an elevator system noise source such as noise or vibrations 143 from elevator components including a rolling/bearing element that is engaged with the guide rail 109, rolling/drive members 139 associated with the drive mechanism 135, rollers/bearings associated with the opening and closing of the movable elevator car doors 131 or the movable landing doors 133, as well as other movable elevator components. Furthermore, the monitoring system 141 is arranged to identify a location or direction of the elevator system noise source.

The monitoring system 141 includes a sensor module 151 comprising a sensor housing 153, a first acoustic sensor 155, a second acoustic sensor 157, a first vibration sensor or a first accelerometer 159, a second vibration sensor or a second accelerometer 161, and at least one processor 163. The sensor module 151 may be disposed on a movable elevator car door 131 as shown in FIGS. 2 and 3, may be disposed on a movable elevator car door 131 proximate the drive mechanism 135 as shown in FIG. 4, or may be disposed on the elevator car 103 proximate a guide rail 109, as shown in FIG. 1.

The first acoustic sensor 155 and the second acoustic sensor 157 may be disposed within the sensor housing 153. The first acoustic sensor 155 and the second acoustic sensor 157 may extend at least partially through a surface of the sensor housing 153. The first acoustic sensor 155 is spaced apart from the second acoustic sensor 157 along an axis 171 along which the elevator car door 131 travels between a closed position and an open position, such that the first and second acoustic sensors 155, 157 are arranged horizontally with respect to each other. In one embodiment, the first acoustic sensor 155 and the second acoustic sensor 157 may be arranged in any desired positional relationship.

The first acoustic sensor 155 and the second acoustic sensor 157 may be stereo sensors or microphones that are arranged to detect noise or receive an acoustic input from an elevator component. The first acoustic sensor 155 is arranged to provide a first acoustic signal to the processor 163 responsive to the first acoustic sensor 155 receiving an acoustic input greater than a threshold, such as an input greater than 1 Hz. The second acoustic sensor 157 is arranged to provide a second acoustic signal to the processor 163 responsive to the second acoustic sensor 157 receiving an acoustic input greater than a threshold, such as an input greater than 1 Hz.

The first accelerometer 159 and the second accelerometer 161 may be disposed within the sensor housing 153. The first accelerometer 159 and the second accelerometer 161 are spaced apart from the first acoustic sensor 155 and the second acoustic sensor 157. In one embedment, only the first acoustic sensor 155 and second acoustic sensor 157 may be employed. In one embodiment, only the first accelerometer 159 and the second accelerometer 161 may be employed. In one embodiment, a first accelerometer 159 may be used without the second accelerometer 161. In one embodiment, more than two acoustic sensors and/or more than two accelerometers may be employed.

The first accelerometer 159 and the second accelerometer 161 are arranged to detect or receive an acceleration or vibratory input from an elevator component. The first accelerometer 159 is arranged to provide a first acceleration signal to the processor 163 responsive to the first accelerometer 159 receiving an acceleration or vibratory input greater than a threshold, such as an input greater than 10 Hz. The second accelerometer 161 is arranged to provide a second acceleration signal to the processor 163 responsive to the second accelerometer 161 receiving an acceleration or vibratory input greater than a threshold, such as an input greater than 10 Hz.

The first electromagnetic sensor 165 and the second electromagnetic sensor 167 may be spaced apart from the sensor housing 153. The first electromagnetic sensor 165 may be disposed on or proximate a movable elevator component and the second electromagnetic sensor 167 may be spaced apart from the first electromagnetic sensor 165 and may be disposed on or proximate a movable elevator component. The first electromagnetic sensor 165 and the second electromagnetic sensor 167 may be at least one of current sensors, capacitive sensors, voltage sensors, or light sensors. The first electromagnetic sensor 165 and the second electromagnetic sensor 167 are arranged to measure a current, capacitance, or voltage across a movable elevator component. The first electromagnetic sensor 165 is arranged to provide a first signal to the processor 163. The second electromagnetic sensor 167 is arranged to provide a second signal to the processor 163. The first signal and the second signal may be provided to the processor 163 intermittently, continuously, or upon request. In one embodiment, any desired number of electromagnetic sensors may be employed, including a single sensor.

The processor 163 may be disposed within the sensor housing 153 or may be a remotely located processor that may be provided with the controller 115. In one embodiment, the processor 163 may be located remotely from the elevator installation or in the cloud. The processor 163 is arranged to receive the first acoustic signal, the second acoustic signal, the first acceleration signal, and the second acceleration signal. The processor 163 is also arranged to receive the first signal and the second signal, should the first and second electromagnetic sensors 165, 167 be provided.

The processor 163 is programmed to identify a direction of an elevator system noise source based on a first time delay between the first acoustic signal and the second acoustic signal. For example, responsive to the first acoustic sensor 155 receiving an input, a first time may be associated with the first acoustic signal and responsive to the second acoustic sensor 157 receiving an input or the same input, a second time may be associated with the second acoustic signal. The processor 163 may then determine the first time delay between the first acoustic signal and the second acoustic signal based on a difference between the first time and the second time. The processor 163 may then determine a direction and distance of the source of noise based in part on the first time delay. Should additional acoustic sensors be provided, the processor 163 may determine additional time delays to further refine the direction and distance of the source of noise.

The processor 163 is programmed to refine or further identify a direction of an elevator system noise source based on a first spatial difference between the first acceleration signal and the second acceleration signal. For example, responsive to the first accelerometer 159 receiving an input, a first spatial identifier identifying the direction (in Cartesian coordinates or the like) of the input may be associated with the first acceleration signal and responsive to the second accelerometer 161 receiving an input or the same input, a second spatial identifier identifying the direction (in Cartesian coordinates or the like) of the input may be associated with the second acceleration signal. The processor 163 may then determine a first spatial difference based on a difference between the first spatial identifier and the second spatial identifier. The processor 163 may then refine or further determine the direction and distance of the source of noise based on the first time delay and/or the first spatial difference.

The processor 163 may also be programmed to determine a proximate location of an elevator system noise source based on a difference between the first signal and the second signal. For example, responsive to a difference between the first signal from the first electromagnetic sensor 165 and the second signal from the second electromagnetic sensor 167 being different than expected (e.g. greater than a threshold or less than a threshold), such as a change in current, capacitance, voltage between the first electromagnetic sensor 165 and the second electromagnetic sensor 167. The change in current, capacitance, voltage between the first electromagnetic sensor 165 and the second electromagnetic sensor 167 may indicate an issue with an elevator component across which the current, capacitance, voltage is measured.

The information of the distance and direction of the source of vibration and noise may give a much more precise prediction of the health status of the elevator system 101 or the escalator that employs the sensor module 151 of the monitoring system 141. The fusion of the information from the first acoustic sensor 155 and the second acoustic sensor 157 along with the information from the first accelerometer 159 and the second accelerometer 161 enables the sensor module 151 of the monitoring system 141 to identify the fault or potential fault. The information provided by the first and second electromagnetic sensors 165, 167 further improves the resolution or identification of the distance and direction of the source of vibration and noise.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system, comprising:
   a car door movable relative to an elevator car by a drive mechanism; and
   a sensor module comprising:
   a first acoustic sensor arranged to provide a first acoustic signal,
   a second acoustic sensor arranged to provide a second acoustic signal,
   a first accelerometer arranged to provide a first acceleration signal,
   a second accelerometer arranged to provide a second acceleration signal,
   and a processor arranged to receive the first acoustic signal and the second acoustic signal;
   the processor is programmed to, responsive to the first acoustic sensor, the second acoustic sensor, the first accelerometer and the second accelerometer, identify a direction of an elevator system noise source based on: a first time delay based on the first acoustic signal and the second acoustic signal and a first spatial difference between the first acceleration signal and the second acceleration signal.

2. The elevator system of claim 1, wherein the sensor module is disposed on the car door.

3. The elevator system of claim 1, wherein the sensor module is disposed on the elevator car.

4. The elevator system of claim 1, wherein the sensor module is disposed proximate the drive mechanism.

5. The elevator system of claim 1, wherein the sensor module is disposed on the elevator car proximate a guide rail of the elevator system.

6. The elevator system of claim 1, the sensor module further comprising:
   an electromagnetic sensor arranged to provide a first signal to the processor, and the processor is programmed to, responsive to the first signal, identify a proximate location of an elevator system noise source.

7. A monitoring system for an elevator, comprising:
   a sensor module comprising:

a first acoustic sensor arranged to provide a first acoustic signal, a second acoustic sensor arranged to provide a second acoustic signal, a first accelerometer arranged to provide a first acceleration signal, a second accelerometer arranged to provide a second acceleration signal, and a processor arranged to receive the first acoustic signal and the second acoustic signal;

the processor is programmed to, responsive to the first acoustic sensor, the second acoustic sensor, the first accelerometer and the second accelerometer, identify a direction of an elevator system noise source based on: a first time delay based on the first acoustic signal and the second acoustic signal and a first spatial difference between the first acceleration signal and the second acceleration signal.

8. The monitoring system of claim 7, wherein an input provided to the first accelerometer and the second accelerometer is greater than 10 Hz.

9. The monitoring system of claim 7, wherein an input provided to the first acoustic sensor and the second acoustic sensor is greater than 1 Hz.

10. The monitoring system of claim 7, wherein the first acoustic sensor is spaced apart from the second acoustic sensor along an axis along which an elevator car door travels between a closed position and an open position.

11. The monitoring system of claim 7, wherein the sensor module is disposed on a car door of the elevator.

12. The monitoring system of claim 7, further comprising:

a first electromagnetic sensor arranged to provide a first signal to the processor; and a second electromagnetic sensor arranged to provide a second signal to the processor, the processor programmed to, responsive to a difference between the first signal and the second signal being greater than a threshold, identify a proximate location of an elevator system noise source.

13. The monitoring system of claim 12, wherein the first electromagnetic sensor and the second electromagnetic sensor are at least one of a current sensor, a capacitive sensor, a voltage sensor, and a light sensor.

14. A sensor module for an elevator monitoring system, comprising:

a first acoustic sensor arranged to provide a first acoustic signal;

a second acoustic sensor arranged to provide a second acoustic signal;

a first accelerometer arranged to provide a first acceleration signal;

a second accelerometer arranged to provide a second acceleration signal; and a processor arranged to receive the first acoustic signal, the second acoustic signal, the first acceleration signal, and the second acceleration signal, the processor being programmed to, responsive to the first acoustic sensor, the second acoustic sensor, the first accelerometer, and the second accelerometer, identify a direction of an elevator system noise source based on: a first time delay between the first acoustic signal and the second acoustic signal and a first spatial difference between the first acceleration signal and the second acceleration signal.

\* \* \* \* \*